(12) United States Patent
Doxey et al.

(10) Patent No.: US 6,331,015 B1
(45) Date of Patent: Dec. 18, 2001

(54) AIR BAG FOLD AND METHOD

(75) Inventors: Mark Harvey Doxey, Troy; David Scott Weckesser, Huber Heights, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/416,798

(22) Filed: Oct. 13, 1999

(51) Int. Cl.[7] .................................................. B60R 21/16
(52) U.S. Cl. ................................ 280/743.1; 280/728.1; 280/730.2
(58) Field of Search ........................... 280/743.1, 728.1, 280/730.1, 730.2

(56) References Cited

U.S. PATENT DOCUMENTS

| | | | |
|---|---|---|---|
| 5,496,056 | * | 3/1996 | Dyer .................................. 280/728.1 |
| 5,667,243 | * | 9/1997 | Fisher et al. ...................... 280/730.2 |
| 5,730,463 | | 3/1998 | Fisher et al. ...................... 280/743.1 |
| 5,765,863 | * | 6/1998 | Storey et al. ........................ 280/729 |
| 5,848,804 | * | 12/1998 | White, Jr. et al. ................. 280/743.1 |
| 5,855,393 | * | 1/1999 | Keshavaraji ....................... 280/743.1 |
| 5,899,490 | * | 5/1999 | Wipasuramonton et al. .... 280/730.2 |
| 5,906,395 | * | 5/1999 | Isaji et al. ......................... 280/743.1 |
| 5,913,536 | * | 6/1999 | Brown ............................... 280/730.2 |
| 5,931,498 | * | 8/1999 | Keshavaraji ....................... 280/743.1 |
| 6,142,507 | * | 11/2000 | Okuda et al. ..................... 280/730.2 |

* cited by examiner

*Primary Examiner*—J. J. Swann
*Assistant Examiner*—J. Allen Shriver
(74) *Attorney, Agent, or Firm*—Kathryn A. Marra

(57) ABSTRACT

An air bag has a neck portion for containing an inflator and receiving the inflator gas therein. A main body portion extends from the neck portion to an outermost edge. The main body portion is folded about a main fold line intermediate the top and bottom edges to substantially fold the main body portion in half The main body portion is then folded about a plurality of accordion folds working from the outer edge to the neck portion to form a compact stack. The stack may be further folded about a pleat fold line to position the folded stack adjacent the neck portion. The air bag and inflator are then stored in a housing. The air bag fold inhibits the air bag from unfolding about the main fold line until the air bag is fully extended.

11 Claims, 3 Drawing Sheets

AIR BAG FOLD AND METHOD

BACKGROUND OF THE INVENTION

1. Field of the Invention

The present invention relates to a vehicle air bag module, and more particularly to an air bag module having an improved fold configuration.

2. Description of the Related Art

It is well known in motor vehicles to employ inflatable air bags to restrain an occupant during an impact. Air bags are commonly mounted in an air bag module subassembly with an inflator for generating gas to inflate the air bag upon sensing predetermined vehicle conditions. The air bag module may be mounted in the instrument panel, seat, door, or other locations within the vehicles. It is also known to provide a side impact air bag for protecting the head and/or torso of the occupant. Two such air bag modules are disclosed in U.S. Pat. Nos. 5,730,463 and 5,667,243 and are hereby incorporated herein by reference.

SUMMARY OF THE INVENTION

The present invention provides an alternate air bag fold and a method of folding an air bag for use with air bags in modules for side impact. The air bag has a neck portion for containing an inflator and receiving the inflator gas therein. A main body portion extends from the neck portion to an outermost edge. The main body portion is folded about a main fold line intermediate the top and bottom edges to substantially fold the main body portion in half. The main body portion is then folded about a plurality of accordion folds working from the outer edge to the neck portion to form a compact stack. The stack may be further folded about a pleat fold line to position the folded stack adjacent the neck portion. The air bag fold inhibits the air bag from unfolding about the main fold line until the air bag is fully extended thereby possibly helping to reduce injury for certain module and vehicle configurations.

DESCRIPTION OF THE PREFERRED EMBODIMENTS

Figure 1:
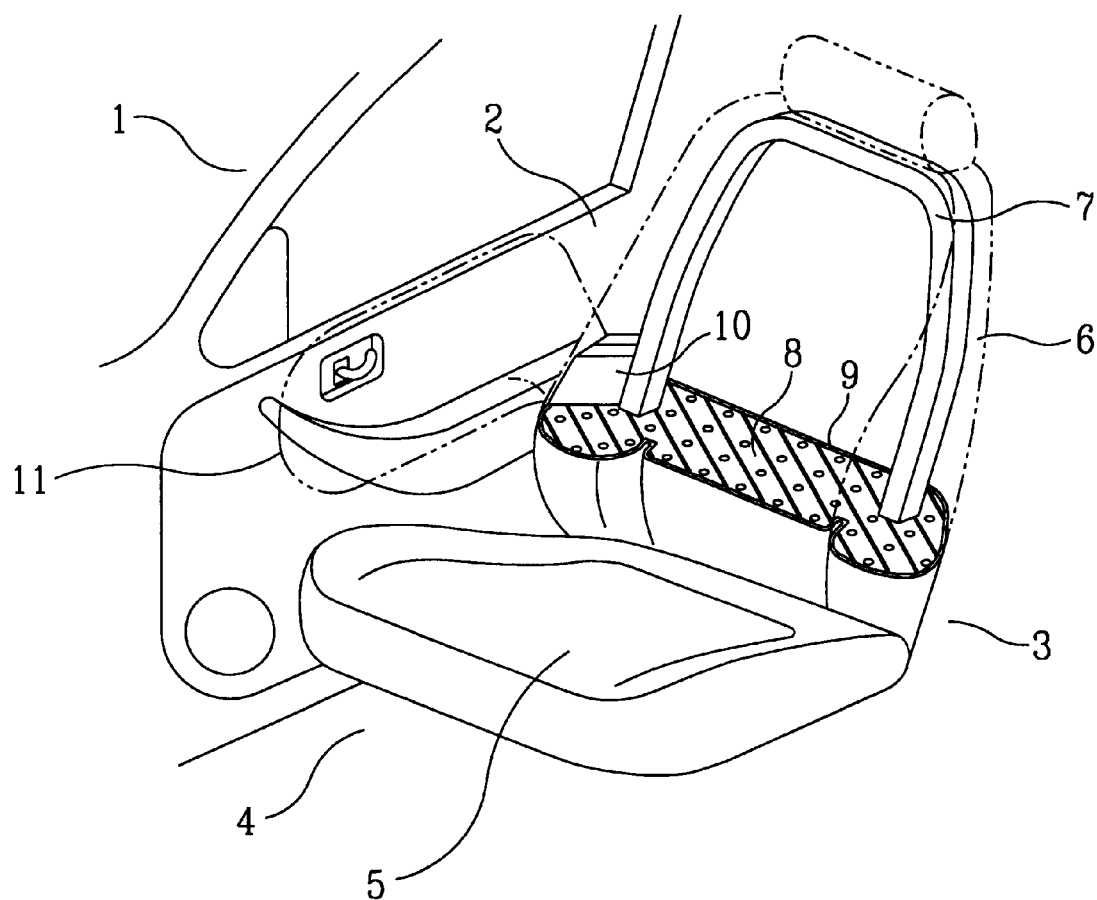
FIG. 1 is a perspective view of a vehicle interior partially broken and showing an air bag module located in a seat.

The present invention is directed to a particular air bag fold for use in side air bag configuration as generally illustrated in FIG. 1. FIG. 1 depicts a vehicle 1 having a side door 2 and seat 3 mounted on a floor 4 within the vehicle 1 interior adjacent the side door 2. The seat 3 has a bottom 5 for supporting an occupant and a seat back 6. The seat bottom 5 and seat back 6 further include a rigid frame 7 covered by a cushion 8 and fabric 9 material to define the outer contour of the seat 3. An air bag module 10 is installed in a side of the seat back 6 adjacent the side door 2 for deploying an air bag 11 to help protect an occupant during a side impact event. The air bag 11 is depicted in dashed lines representing the air bag 11 in a deployed condition.

Figure 2:
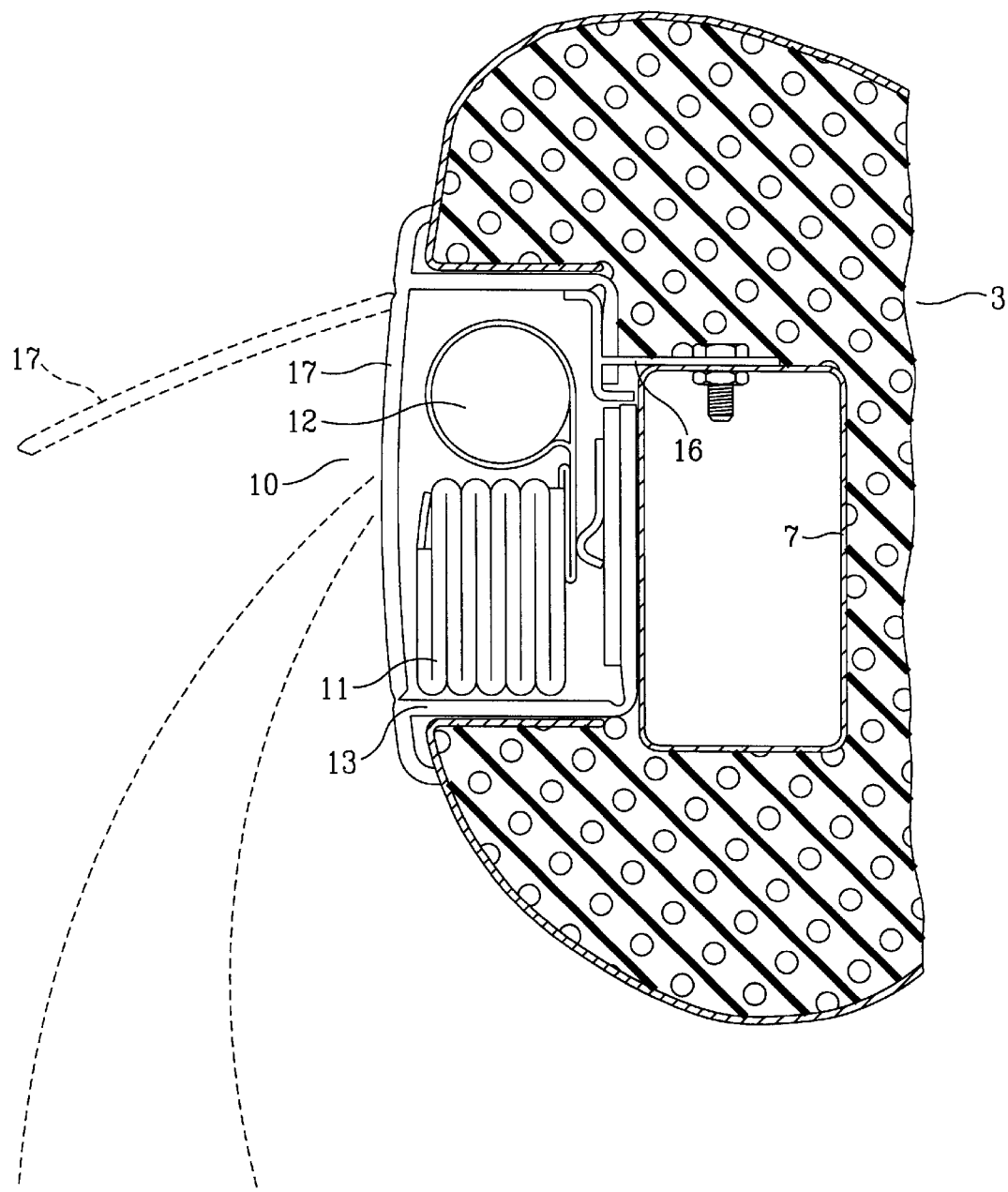
FIG. 2 is a sectional view through the vehicle seat showing a top view of the module with the module partially broken away and showing the air bag in a folded undeployed condition.

FIG. 2 illustrates the air bag module 10 mounted within the seat 3. The air bag module 10 includes an inflator 12, an air bag 11, a housing 13, and a mounting bracket 16 extending from the housing 13 for mounting the air bag module 10 to any suitable vehicle structure, such as the seat frame 7. The air bag module 10 is positioned to allow the air bag 11 to inflate through a side wall 17 of the housing 13 to expand within the vehicle interior adjacent the side door 2. While the specific arrangement of the air bag module 10 depicted in FIG. 2, is the preferred embodiment for the present air bag fold, the present air bag fold is in no way limited to the particular configuration of the air bag module 10, and housing 13 shown. It is understood that the present air bag fold may be employed in air bag modules and housings known within the art.

Figure 3:
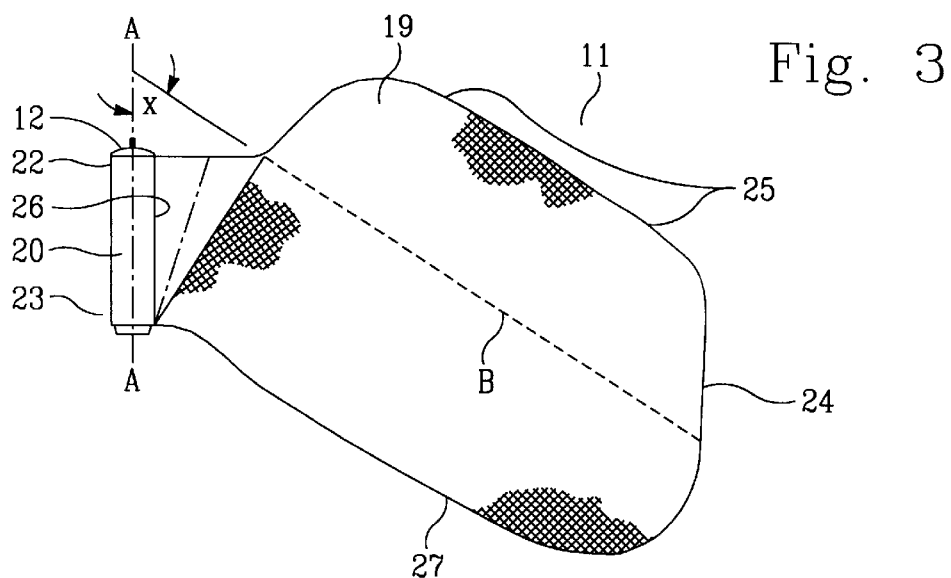
FIGS. 3–6 are perspective views illustrating the steps of folding the air bag.

FIGS. 3–6 depict the air bag fold according to the present invention. Referring to FIG. 3, the air bag generally shown as 11 is preferably made of a fabric material suitable for air bag construction as may be known in the art. The air bag 11 is shaped and folded to possibly reduce forces on a vehicle occupant during inflation, for certain module or vehicle configurations. Specifically, the air bag 11 is folded to inhibit a main fold B from unfolding until the entire air bag 11 is fully extended outward from the housing 13. The air bag 11 includes a main body portion 19, and a neck portion 20. The neck portion 20 preferably extends along a longitudinal axis A—A and has a side opening sized to receive an inflator 12 therein. It will be appreciated that in the assembled position, the neck portion 20 is wrapped around the inflator 12 such that the inflator gas is discharged directly into the air bag 11. The inflator 12 may be inserted into the opening in the neck portion 20 of the air bag 11 either before or after installation of the air bag 11 into the housing 13. The neck portion 20 of the air bag 11 has an upper neck edge 22 and a lower neck edge 23 corresponding with the upper inflator end and lower inflator end respectively. The longitudinal axis A—A of the inflator 12 is also the longitudinal axis of the neck portion 20. The air bag 11 further includes an inflatable main body portion 19 which is stored in the housing 13 in a folded condition which inflates upon discharge of the inflator gas. FIG. 2 depicts the air bag 11 in its folded condition within the housing 13.

The inflatable main body portion 19 of the air bag 11 is asymmetrical about axis A—A extending from the neck portion 20. As best shown in FIG. 3, preferably a greater portion of the main body portion 19 is located below the axis A—A than is located above the axis A—A. The lower portion extending lower than the lowermost portion of the neck portion 20 has a volume significantly greater than the upper portion of the main body portion 19. The lower portion has an increasing vertical dimension in a direction away from the neck portion 20 and inflator 12.

The air bag 11 includes peripheral edges. Relative to the longitudinal axis A—A of the inflator 12 and neck portion 20, the air bag 11 includes an outer edge 24 opposite the neck portion 20, a downwardly angled upper edge 25, a generally vertically extending forward edge 26 adjacent the neck portion 20 and a downwardly angled lower edge 27. The downwardly angled upper edge 25 and lower edge 27 are preferably parallel to each other and preferably define a downward air bag extending at an acute angle X at which the main body portion 19 of the air bag 11 extends downwardly relative the longitudinal axis A of the inflator 12, neck portion 20, and housing 13.

Figure 4:
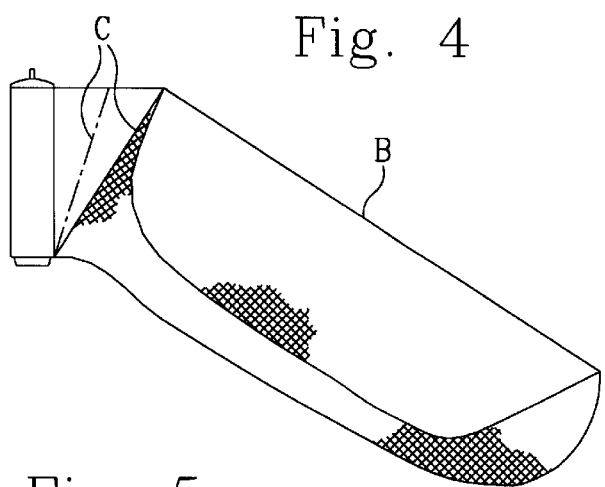
Figure 5:
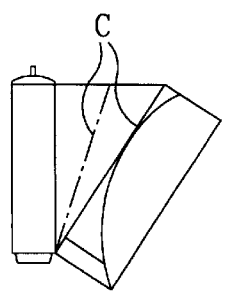
Figure 6:
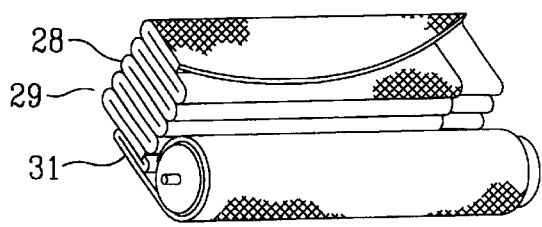

The air bag 11 is specifically folded to inhibit the air bag 11 from unfolding before the air bag 11 is fully extended from the housing 13. FIGS. 3–6 depict the air bag 11 in different folding stages. FIG. 3 depicts the air bag 11 in an unfolded condition. Dashed line B represents a main fold line B disposed intermediate the upper edge 25 and lower edge 27 of the main body portion 19 and substantially parallel thereto. The main body portion 19 is first folded substantially in half about the main fold line B. FIG. 4 depicts the main body portion 19 folded about the main fold line B. The main body portion 19 is then folded about a plurality of accordion folds 28 to form a compact stack 29. The main body portion 19 is folded about a plurality of accordion fold lines working from the outer edge 24 of the main body portion 19 towards the neck portion 20. In the preferred embodiment the main body portion 19 is folded to comprise at least five accordion folds 28. The main body portion 19 is then folded about pleat fold lines C to align the folded stack 29 with the neck portion 20. In so doing, the main fold line B is oriented to be substantially orthogonal to the longitudinal axis A—A of the neck portion 20. The pleat fold lines C are shown in FIG. 4. Preferably two pleat folds 31 are necessary to tuck the pleat folds 31 underneath the folded stack 29 rather than underneath the neck portion 20.

Prior to folding the air bag 11, the inflator 12 may be inserted into the neck portion 20 and neck portion 20 wrapped around the inflator 12 in such a way so as to direct gas discharged from the inflator 12 into the air bag 11 and main body portion 19 thereof as is known in the art. The folded air bag 11, air bag stack 29 and inflator are then assembled within the housing 13 as shown in FIG. 2. The air bag fold of the present invention is preferably employed in the housing configuration shown in FIG. 2.

The present air bag fold is intended to inhibit the main body portion 19 from unfolding about the main fold line B until the air bag 11 has fully extended from the housing 13 and the main body portion 19 has unfolded all of the accordion 28 and pleat folds 31.

When the vehicle 1 senses predetermined conditions, the inflator will discharge gas and inflate the air bag 11. As seen in FIG. 2, the inflating air bag begins to fill and expand and will eventually break open side wall 17 of the air bag module 10 and extend into the vehicle interior adjacent the side door 2. The air bag 11 will first unfold about the pleat folds 31 and accordion folds 28. Because the main body portion 19 is folded substantially in half about the main fold line B, the upper edge 25 and lower edge 27 are inhibited from expanding until all of the accordion folds have unfolded and the air bag has fully extended from the housing 13. This air bag fold thus hinders the air bag from fully unfolding about the main fold line until the air bag has fully extended. The present design preferably results in a reduction in forces that may be exerted on an occupant during deployment of the air bag.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims. For example, the present air bag fold may be employed in numerous air bag modules placed in various locations in the vehicle to protect an occupant. Although the air bag module 10 of the present invention is shown located in the seat 3 on a passenger's side of the vehicle 1, it will be appreciated that the shape and fold of the air bag can be mirrored for use in a seat on a driver's side of the vehicle 1 and can also be used on rear seats of the vehicle 1. It will further be appreciated that the module 10, and air bag 11 fold of the present invention can also be used at other locations where it is desirable to direct the air bag to protect an occupant. These and other modifications are contemplated by the present design and reference to the specific descriptions contained herein are not intended to be limiting, but intended to cover the invention broadly within the scope and spirit of the appended claims.

What is claimed is:

1. An air bag comprising:

a neck portion having an opening adapted to receive an inflator therein for discharging gas and inflating said air bag, said neck portion extending substantially along a longitudinal axis;

a main body portion extending from said neck portion, said main body portion having a top and bottom edge folded about a main fold line, said main fold line disposed substantially intermediate said top and bottom edges and extending from said neck portion to an outer edge of said main body portion opposite said neck portion, said main fold line extending at an acute angle relative to said longitudinal axis and substantially parallel to said top and bottom edges;

a triangular-shaped intermediate portion between said neck portion and said main body portion, said intermediate portion disposing said main fold line at said acute angle with respect to said longitudinal axis of said neck portion;

wherein said main body portion further comprises a plurality of accordion folds along said main fold line forming a stack to compact said folded main body portion to a position adjacent said neck portion.

2. The air bag according to claim 1, wherein said main body portion includes an additional pleat fold adjacent said neck portion to align said stack adjacent said neck portion and orient said fold line substantially orthogonal to said longitudinal axis.

3. The air bag according to claim 2, wherein said plurality of accordion folds includes at least five accordion folds.

4. An air bag comprising a neck portion extending in a longitudinal axis and having an opening adapted to receive and retain an inflator therein for discharging gas and inflating said air bag;

a main body portion having top and bottom edges extending from said neck portion to an outer edge portion opposite said neck portion, wherein said main body portion being first folded about a main fold line intermediate and substantially parallel to said top and bottom edges thereby folding said main body portion in half, said main body portion further being folded along a plurality of accordion fold lines thereby forming a stack to compact said folded main body portion, said plurality of accordion fold lines being substantially orthogonal to said main fold line along substantially an entirety of said main fold line.

5. The air bag according to claim 4, wherein said main fold line extends at an acute angle relative to said longitudinal axis and said main body portion further comprises a pleat fold adjacent said neck portion to align said stack with said neck portion and to orient said main fold line substantially orthogonal to said longitudinal axis.

6. A method of folding an air bag for storage in a housing, said air bag having a neck portion adapted to receive an inflator to inflate said air bag and main body portion extending from said neck portion, said method comprising the steps of:

inserting said inflator within said neck portion;

providing a first fold of said main body portion about a main fold line extending from said neck portion and substantially parallel to and substantially intermediate between a top and bottom edge portion of said main body portion;

providing a plurality of second folds of said main body portion substantially along an entirety of said main fold line to form a plurality of accordion folds about accordion fold lines substantially perpendicular to said main fold line and forming said main body portion into a compact stack adjacent proximate said neck portion; and storing said folded air bag within said housing.

7. The method of folding an air bag according to claim 6, wherein said step of providing said first fold of said main body includes folding said main fold line such that said main fold line extends at an acute angle relative to an axis of said neck portion.

8. The method of folding an air bag according to claim 6, wherein after providing said second fold, said method further comprises a step of providing a pleat fold of said main body portion about a pleat fold line substantially perpendicular to said accordion fold lines and aligning said compact stack adjacent said neck portion.

9. The air bag according to claim 1, wherein the acute angle is greater than zero degrees.

10. The air bag according to claim 4, further comprising a triangular-shaped intermediate portion between said neck portion and said main body portion, said intermediate portion disposing said main fold line at an acute angle with respect to said longitudinal axis of said neck portion.

11. The air bag according to claim 4, wherein the acute angle is greater than zero degrees.

* * * * *